United States Patent [19]
Swift et al.

[11] Patent Number: 5,207,504
[45] Date of Patent: May 4, 1993

[54] METHOD AND APPARATUS FOR TUNING STRIP FLOURESCENT LIGHT FIXTURES

[76] Inventors: Gerald R. Swift; Todd Snyder, both of 1006 Third Ave., Yakima, Wash. 98902

[21] Appl. No.: 725,202

[22] Filed: Jul. 3, 1991

[51] Int. Cl.⁵ .................................................. F21S 3/00
[52] U.S. Cl. .................................. 362/260; 362/147; 362/217
[58] Field of Search ............... 362/147, 217, 260, 362, 362/148, 484, 363

[56] References Cited

U.S. PATENT DOCUMENTS

| | | | |
|---|---|---|---|
| 4,403,275 | 9/1983 | Oser | 362/368 |
| 4,562,517 | 12/1985 | Pankin | 362/217 |
| 4,599,684 | 7/1986 | Lee | 362/217 |
| 4,613,929 | 9/1986 | Totten | 362/404 |
| 4,652,983 | 3/1987 | Mytels | 362/220 |
| 4,799,134 | 1/1989 | Pinch et al. | 362/217 |

*Primary Examiner*—Richard R. Cole
*Attorney, Agent, or Firm*—Stratton, Bellomy, Ballew & Richardson

[57] ABSTRACT

A tunable high intensity lighting system comprising at least a light enclosure box, an elongated shaped reflector, and a lens. The high intensity lighting system can be retrofitted to existing strip fluorescent light fixtures to adapt the existing fixture to obtain desired lighting characteristics for a specific application. By using different combinations of components, different light intensities, and tint and glare characteristics are obtained. A method for tuning existing strip fluorescent light fixtures also is disclosed, as is a kit for preselected applications, where the kit contains the components for the retrofitting to the existing fixture.

12 Claims, 7 Drawing Sheets

5,207,504

METHOD AND APPARATUS FOR TUNING STRIP FLOURESCENT LIGHT FIXTURES

TECHNICAL FIELD

This invention relates to a method and apparatus for tuning strip fluorescent light fixtures to increase the intensity, while improving the tint and glare characteristics of existing strip fluorescent light fixtures for specific applications. More particularly, this invention relates to a tunable high intensity lighting system which may be retrofitted by attaching to the existing strip fluorescent housing a light enclosure box with fluorescent tube sockets, which encloses and contains an elongated shaped reflector, tubes, and a lens which fits at the bottom of the light enclosure box.

BACKGROUND OF THE INVENTION

Lighting in industrial and other environments presents a number of problems in obtaining the desired lighting characteristics for a particular work application. Intensity of the light, tint of the light, and glare characteristics of the light are some of the major characteristics of the light which may need to be adjusted for particular applications.

Increasing the overall amount of light to obtain the desired intensity may also increase the glare from the lighting source which actually can make it more difficult to see. Glare is a major contributor to worker fatigue and increases the possibility of worker error. Increasing the intensity of light from a light source also can present problems with respect to heat generated by the lighting source. As an example, enclosed high output fluorescent lights require water cooling to perform correctly. The increased complexity introduced by water cooling increases the initial cost, decreases reliability, increases maintenance costs and is undesirable in many industrial applications.

Attempts to increase the intensity of lighting in desired work areas is not as straightforward as it would appear. If, for example, existing strip fluorescent light fixtures are being used, simply changing a two tube fixture to a four tube fixture may not provide a significant increase in lighting intensity in the area in which the lighting is desired, although it will certainly increase both glare and operating costs. While new fixtures utilizing different types of lighting are an option, in most industrial and commercial situations, there already exists a large investment in existing high output and other types of strip fluorescent light fixtures. Any change to totally new lighting systems, such as halogen lights, would require rewiring and re-engineering which would be prohibitively expensive for most businesses.

Other problems with lighting in industrial applications are arising from new methods of conducting business among commercial establishments. Whether a manufacturer or service company, businesses have adopted methods which involve frequent changes in the products they provide and therefore the physical facilities that they inhabit. For example, a manufacturer may change a product on a yearly basis. Another example is fruit sorting establishments where the fruit sorted changes with the season. In businesses experiencing frequent changes in their physical plant, there is a need for commercial lighting that can be readily adjusted to the new requirement. Unfortunately, most existing fixtures do not provide much flexibility in adapting the light fixture for different levels of intensity, tint control, or glare characteristics. The only options may be to change the types of tubes in an existing fixture which has a limited effect, or have different fixtures for different applications, which also can be prohibitively expensive.

As seen from the above discussion, there are a number of desirable characteristics for tuning strip fluorescent light fixtures to improve the intensity, tint, and glare characteristics in existing strip fluorescent light fixtures. It would be desirable to have a high intensity lighting system which can be retrofitted to an existing strip fluorescent light fixture. It also would be desirable to have a high output strip fluorescent light fixture which can be adjusted for intensity, tint, and glare characteristics of the light it emits. Further, it would be desirable to have a high output strip fluorescent light fixture which would be used without special cooling requirements or rewiring.

While the discussion here relates to a method and apparatus for tuning strip fluorescent light fixtures to improve the intensity, tint, and glare characteristics in existing strip fluorescent light fixtures, it is not intended that the invention be limited to this situation. It will be obvious from the description that follows that the present invention will be useful in other applications with problems common to those described herein.

DISCLOSURE OF THE INVENTION

It is an object of the present invention to provide a tunable high intensity lighting system which can be retrofitted to existing strip fluorescent light fixtures.

It also is an object of the present invention to provide a tunable high intensity lighting system which is adjustable in intensity, tint, and glare characteristics of the light emitted so that these characteristics can be adapted for a specific environment or task.

It is a further object of the present invention to provide a tunable high intensity lighting system which can be adapted to provide light for two or more work stations from a single fixture where the lighting characteristics for the two or more work stations vary in intensity, tint, and glare characteristics.

It is an additional object of the present invention to provide a method for adjusting the intensity, tint, and glare characteristics of light emitted from an existing strip fluorescent light fixture to the desired levels for a specific application.

It is another object of the present invention to provide a kit which allows an existing strip fluorescent light fixture to be upgraded to a tunable high intensity lighting system.

The present invention achieves these and other objectives which will become apparent from the description that follows, by providing a high intensity lighting system which includes at least a light enclosure box, an elongated shaped reflector, and a lens. The light enclosure box has sides, a top and an open bottom. The light enclosure box is attachable to an existing strip fluorescent housing by an attachment system. The elongated shaped reflector fits within the light enclosure box, and is curved downward toward the bottom of the enclosed box. High output fluorescent tubes fit within the shaped reflector and are plugged into strip fluorescent sockets inside the top of the light enclosure box. Attached to the enclosure light box bottom is the lens. In this embodiment, the elongated shaped reflector, tubes, and lens can all be interchanged to adjust the light intensity, tint, and glare characteristics to achieve a desired lighting effect for a particular application.

An alternative preferred embodiment constructed in accordance with the present invention provides a kit for tuning strip fluorescent light fixtures which includes at least a light enclosure box, an elongated shaped reflector, and a lens. In this embodiment, the kit is packaged as a unit to be retrofitted for specific applications where the correct combination of components to achieve the desired lighting has been predetermined.

Another alternative preferred embodiment in accordance with the present invention provides a method for tuning existing strip fluorescent light fixtures for particular applications is provided. In the method of this preferred embodiment, the combination of high output ballast, light enclosure box, elongated shaped reflector, fluorescent light sockets, high output fluorescent light tubes, and lens is determined that will result in the emitted light with the desired characteristics. After the correct components have been determined, they are installed on the existing strip fluorescent housing as needed.

In this method of alternative preferred embodiment, the installation of the selected components can include the steps of removing the ballast, reflector, sockets, and tubes from the existing strip fluorescent light fixture, leaving the existing strip fluorescent housing in place. A high output ballast can be placed within the existing strip fluorescent housing, if needed. Then, the light enclosure box with the shaped reflector is attached to the existing strip fluorescent housing. After the light enclosure box is attached, the high output fluorescent tubes are plugged into the fluorescent light sockets and the desired lens is attached to and substantially covers the bottom of the light enclosure box.

In yet another alternative preferred embodiment in accordance with the present invention, a translucent screen is attached to the lens so that the translucent screen substantially covers the lens. Such a screen can be used to change the tint of light emitted by the fixture and/or reduce the intensity of the light fixture.

A further alternative preferred embodiment in accordance with the present invention uses a shaped reflector can be tinted to change both the intensity and the tint of the lighting emitted by the fixture.

An additional alternative preferred embodiment in accordance with the present invention uses the curved elongated reflector is divided laterally so that a first section of it is tinted and a second section is tinted differently or not at all, thereby allowing light with two different characteristics to be emitted from a single fixture. This enables a single fixture to provide lighting for work areas requiring two different types of lighting. Also, in this alternative preferred embodiment, the lens can be divided into two sections that correspond substantially to the first and second sections of the elongated shaped reflector. The use of different lenses can further enhance the tuning of light for two different work stations.

Other additional alternative preferred embodiments in accordance with the present invention can result from different combinations of preferred embodiments described above, or elements of those embodiments in different combinations.

DETAILED DESCRIPTION OF PREFERRED EMBODIMENTS

Figure 1:
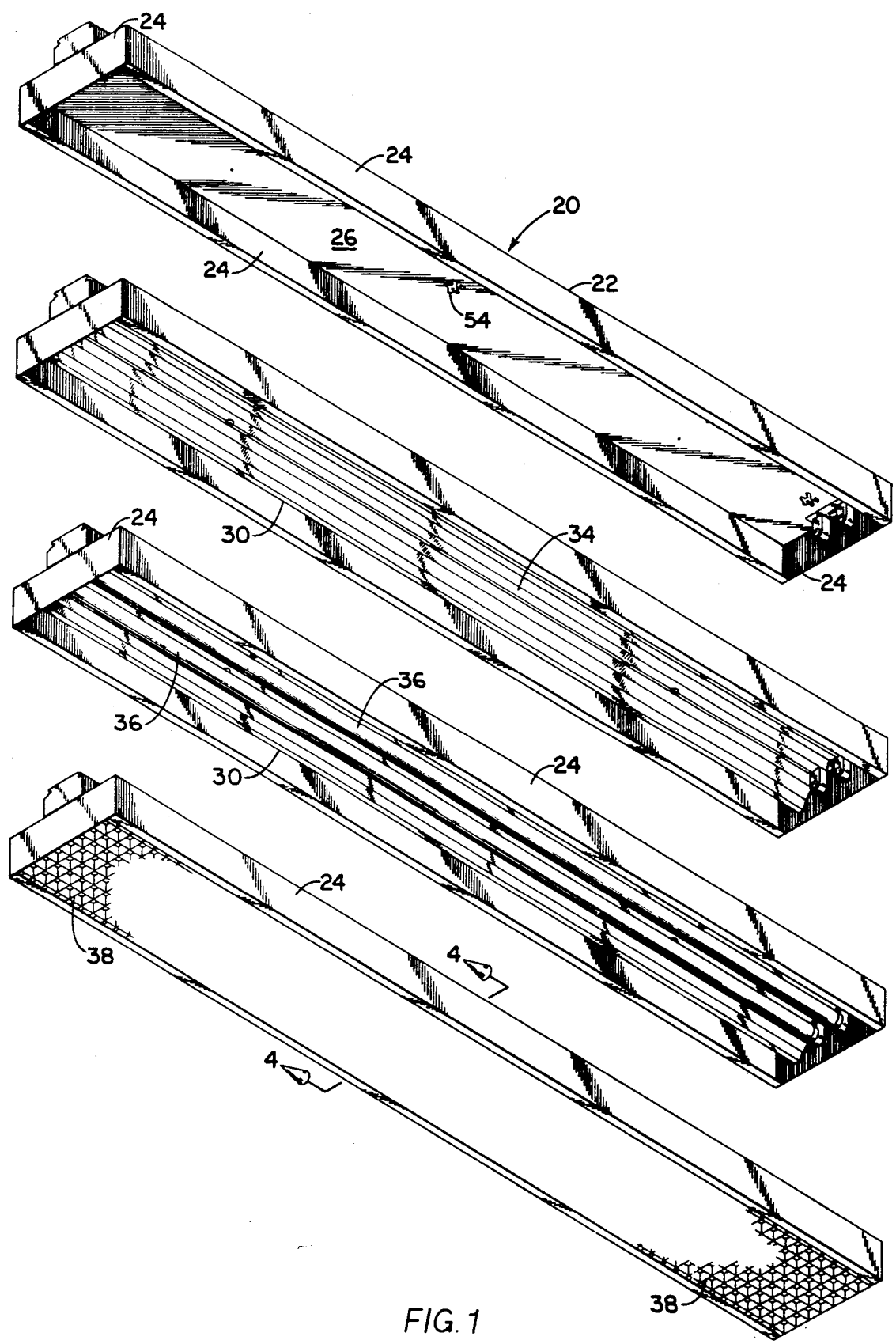
FIG. 1 is a perspective view of a preferred embodiment constructed in accordance with the present invention which shows the progressive assembly of that embodiment.
Figure 2:
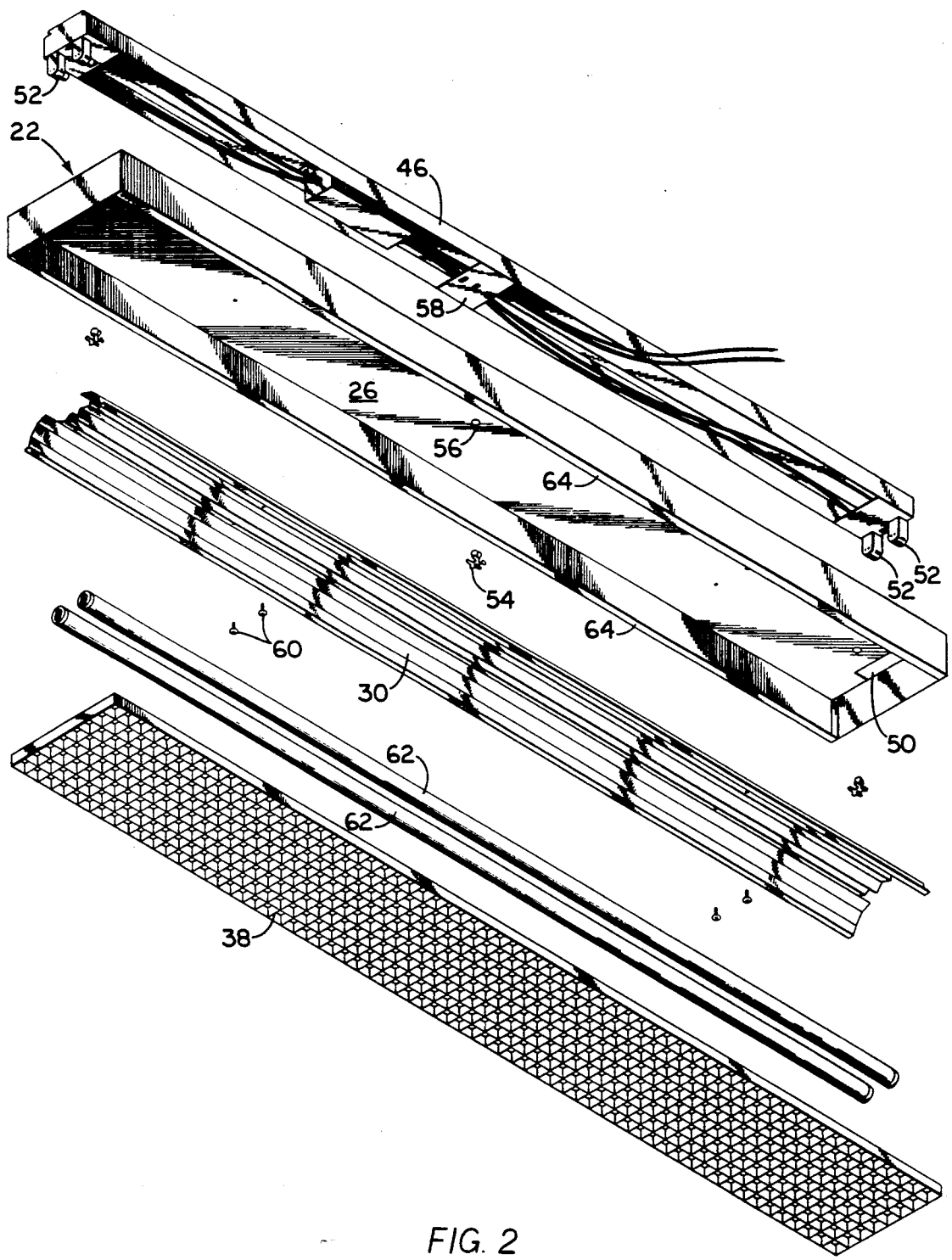
FIG. 2 is an exploded view of a preferred embodiment constructed in accordance with the present invention.

With reference to FIG. 1 a high intensity lighting system 20 is shown. The high intensity lighting system has a light enclosure box 22 with sides 24 a top 26 and a substantially open bottom 28. The light enclosure box is a hollow, substantially enclosed box with the exception of its substantially open bottom. Fitting within the light enclosure box is an elongated shaped reflector 30. Along its length, the elongated shaped reflector is substantially straight while laterally it has a shape that opens downward. This lateral shape is substantially uniform for the length of the elongated shaped reflector. The elongated shaped reflector has an inner surface 34 which reflects light from inside the light enclosure box. Two high output fluorescent tubes 36 fit within the inner surface of the elongated shaped reflector. Attached to and substantially covering the substantially open bottom is a lens 38.

Figure 3:
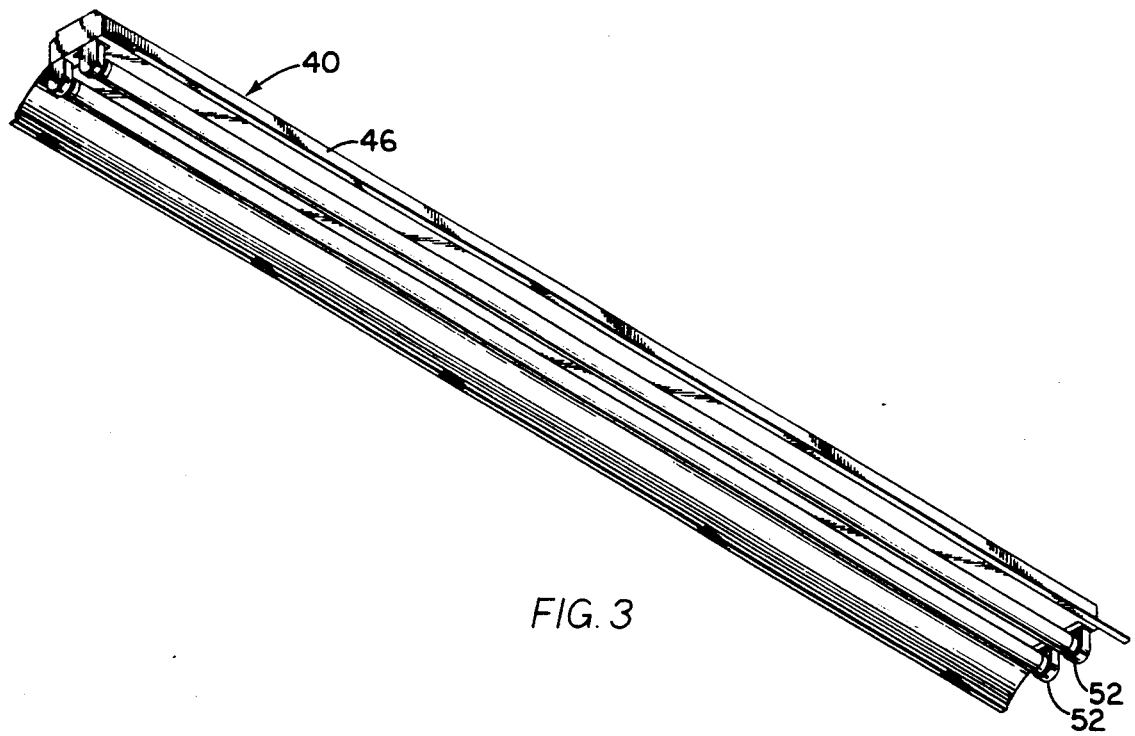
FIG. 3 is a perspective view of an existing strip fluorescent light fixture.
Figure 4:
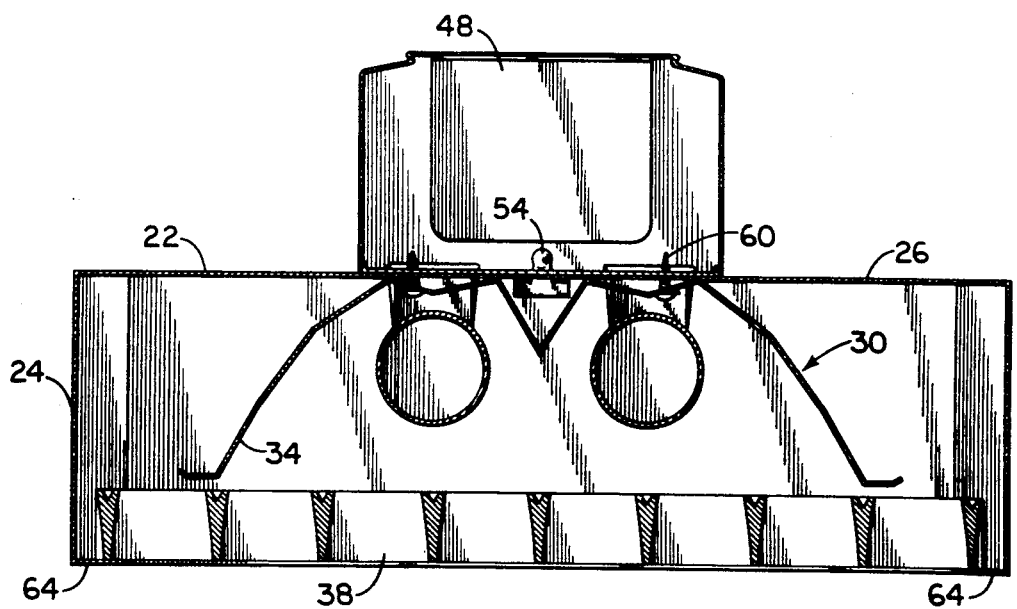
FIG. 4 is a cross-section view of a preferred embodiment constructed in accordance with the present invention taken along lines 4—4 in FIG. 1.

The high intensity lighting system 20 is retrofitted to an existing strip fluorescent light fixture 40, as shown in FIG. 3. After the existing fluorescent tubes 42, and reflector 44 are removed from the existing strip fluorescent light fixture, a strip fluorescent housing 46 is left. The ballast (not shown) may or may not be removed. It is this component that is wired into the ceiling, wall, etc., in the commercial and industrial application.

To install the high output strip fluorescent light fixture 20, the light enclosure box 22 is attached to the strip fluorescent housing 46. The light enclosure box top 26 has slots 50 which enables the fluorescent light sockets 52 to extend within the light enclosure box. The light enclosure box can be affixed to the strip fluorescent housing using attachment mechanisms, such as twist and lock devices 54, as shown in FIG. 1 which pass through holes 56 in the light enclosure box top 26 and holes 58 in the existing strip fluorescent housing. The twist and lock devices are practical, but screws, nuts and bolts, and any number of attachment mechanisms common and well known in the mechanical arts would be equally desirable and useful.

After the light enclosure box 22 has been attached to the strip fluorescent housing 46, the elongated shaped reflector 30 is installed within the light enclosure box. The elongated shaped reflector is slightly shorter than the length of the light enclosure box, and is short enough to fit between the fluorescent light sockets 52 which are located proximate the ends of the strip fluorescent housing in corresponding pairs. The elongated shaped reflector can be attached to the light enclosure box by a variety of means of mechanical devices, including screws 60 that are shown.

High output fluorescent tubes 62 are plugged into the fluorescent light sockets 52 of the strip fluorescent housing 46. After the tubes are in place, the lens 38 is fitted to the light enclosure box 22. High output fluorescent tubes are well known in the art and readily available from commercial sources.

The lens in this particular embodiment actually fits within the light enclosure box and rests upon edges 64 which extend inward from the light enclosure box sides 24 at the light enclosure box bottom 28. This way of attaching the lens to the light enclosure box allows the easy access to the interior of the light enclosure box for repair or replacement of components without the necessity of additional attachment mechanisms. At the same time, the lens could also be affixed to the bottom of the light enclosure box by screws or similar attachment means, or even attached to the light enclosure box bottom by a material such as a hook and loop material, like Velcro.

Both the light enclosure box 22 and the elongated shaped reflector 30 can be made from any number of materials which provides sufficient structural strength, and at the same time, are lightweight to function correctly and fabricate economically. Common sheet steel has been used with success and it is anticipated that other metals such as aluminum could be used with equal success. Some plastic materials which can be fabricated with high rigidity and which are reasonably temperature resistant also could be used in the fabrication of the light enclosure box and the elongated shaped reflector.

The drawings show two-bulb strip fluorescent light fixtures, but this should in no way be interpreted as a limitation on the structure of the invention. This invention works equally well with tube configurations from one tube to four or more tubes. Any existing strip fluorescent light fixture can be replaced with an embodiment of the present invention. Of course, the size of the light enclosure box can vary with the size and number of tubes for a specific configuration. By way of example, a size of light enclosure box that has been used with success with an existing strip fluorescent light fixture with two tubes is 96 inches (243.9 cm) in length, 12 inches (30.5 cm) in width, and 4 inches (10.2 cm) in depth.

Typically in commercial and industrial applications, existing strip fluorescent light fixtures are high output fixtures, such as light fixture 40 shown in FIG. 3. If the high intensity lighting system 20 is being retrofitted to an existing high output strip fluorescent lighting fixture, the ballast and fluorescent light sockets 52 in the existing fixture may not need to be changed. If the existing ballast is removed, a high output ballast 48 is installed as a replacement in the strip fluorescent housing 46. A typical high output ballast has an output of approximately 800 milliamps, as opposed to the output of a ballast for a standard strip fluorescent light fixture of approximately 460 milliamps. There are also very high output strip fluorescent light fixtures which use ballasts that have an output of approximately 1500 milliamps. (Note that separate figures for standard or very high output strip fluorescent light fixtures are not shown). They are substantially similar to high output strip fluorescent light fixtures.

Since industrial or commercial situations do typically use high output or even very high output strip fluorescent light fixtures, the high intensity lighting system 20 does not necessarily include a replacement ballast 48 or fluorescent light sockets 52, although it can. In other applications, the high intensity lighting system can be retrofitted to a standard strip fluorescent light fixture to improve the intensity, tint, and glare characteristics of the standard fixtures also. Even if the standard ballast is not replaced with a high output ballast, the use of the light enclosure box 22, the elongated shaped reflector 30, and lens 38 can cause dramatic improvements and allow tuning of the standard strip fluorescent light fixture. Even greater improvements can be obtained by retrofitting a high output ballast 48 in the existing strip fluorescent housing 46 of the standard strip fluorescent light fixture, but such an adaptation requires that fluorescent light sockets 52 for high output fluorescent light tubes 36 also be fitted to the fluorescent light housing of the standard strip fluorescent light fixture. The high intensity lighting system 20 also may be adapted to existing low output strip fluorescent light fixtures, which use a ballast of approximately 260 milliamps.

A high intensity lighting system 20 constructed in accordance with the present invention allows a user to adjust the light emitted by the fixture to obtain the desired characteristics of intensity, tint, and glare by changing both the elongated shaped reflector 30 and lens 38 either separately or together. Another characteristic that is adjusted during the retrofitting of the high intensity lighting system is the size of the area affected by the light from the retrofitted strip fluorescent light fixture. This characteristic is closely related to the light intensity of the fixture. Different combinations of components directly affect the size of the work area that is illuminated by the fixture. Different lens 38 and elongated shaped reflectors 30 can either expand or shrink the area illuminated by the fixture.

Figure 5A:
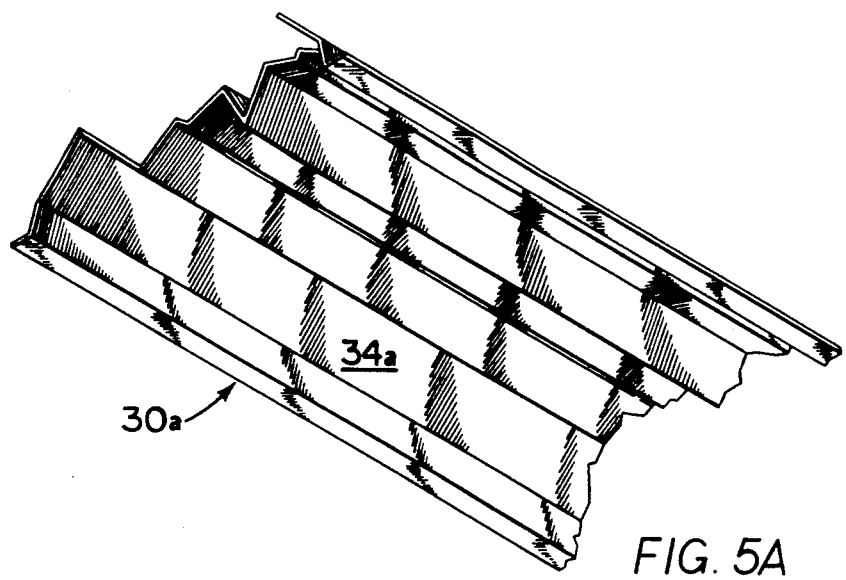
FIG. 5A is partial perspective view of a preferred of an elongated shaped reflector constructed in accordance with the present invention.
Figure 5B:
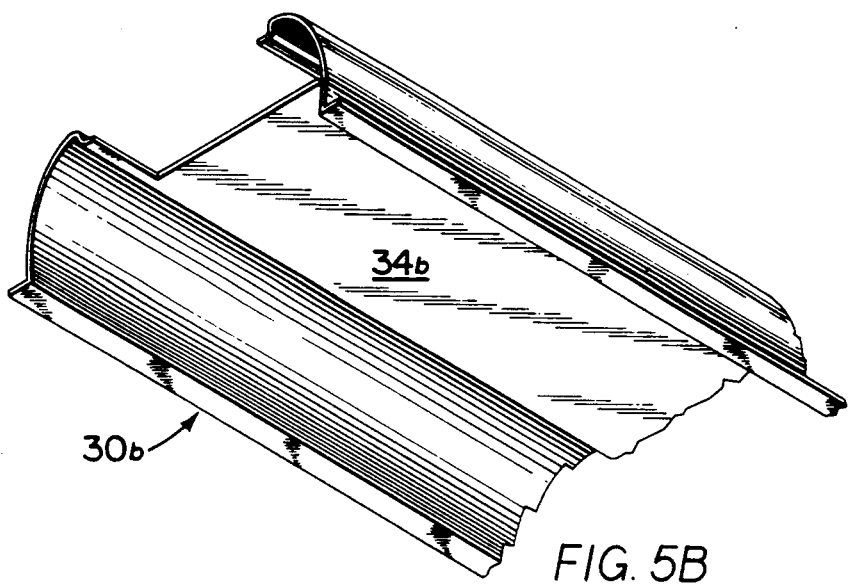
FIG. 5B is a partial perspective view of a second preferred embodiment of an elongated shaped reflector constructed in accordance with the present invention.
Figure 5C:
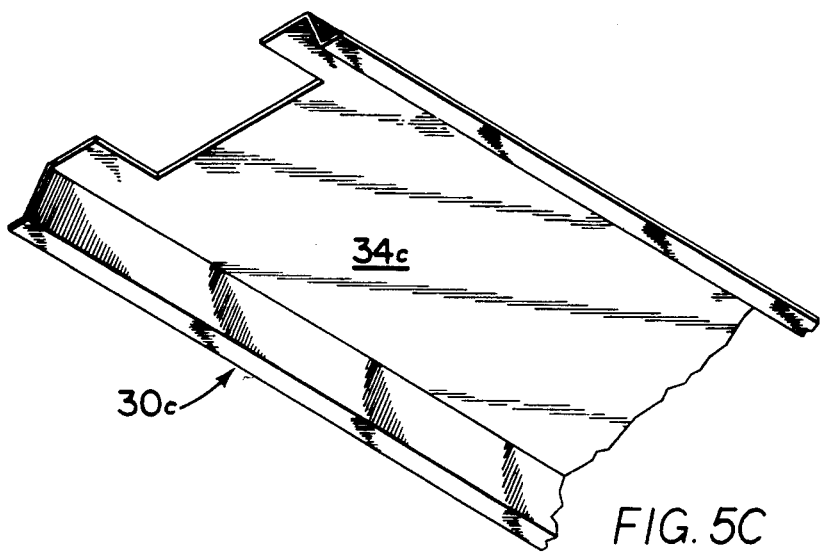
FIG. 5C is a partial perspective view of a third preferred embodiment of an elongated shaped reflector constructed in accordance with the present invention.

FIG. 5A–5C illustrate just some of the configurations of the lateral shapes available in the elongated shaped reflectors 30a, 30b, and 30c for use with the present invention, although these examples are in no way exhaustive. In addition to the variations in shape configuration of the elongated shaped reflector, the finishes of the inner surfaces 34a, 34b, and 34c also effect the intensity, tint, and glare characteristics of the light emitted by the light fixture. Specular, or highly reflective, finishes are desired when higher intensity light is desired. Also the inner surface can be tinted with a colored, translucent film to change the tint of the light emitted from the high output strip fluorescent light fixture while retaining high reflectivity. Also, the inner surface can be painted which can reduce the intensity of the light emitted as well as effecting the tint of the light emitted. The shape configurations of the elongated shaped reflector specifically affect the size of the area illuminated by a fixture retrofitted with the high intensity lighting system 20.

Figure 6A:
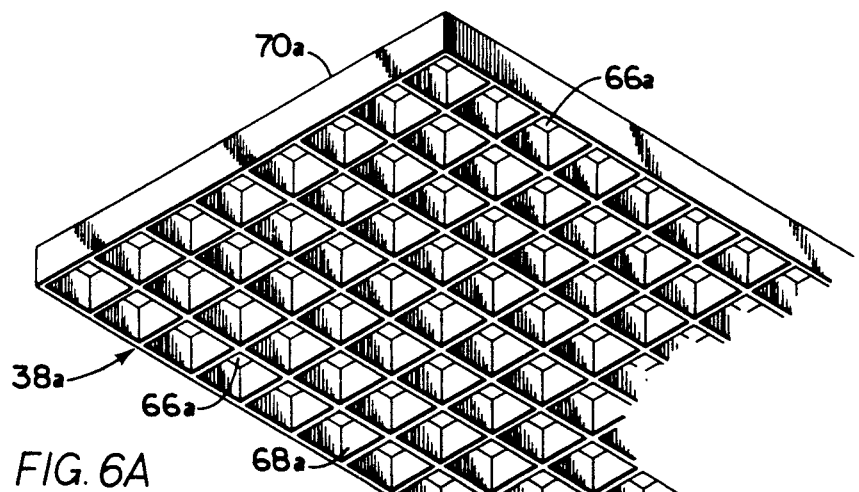
FIG. 6A is a partial perspective view of a preferred embodiment of a lens constructed in accordance with the present invention.
Figure 6B:
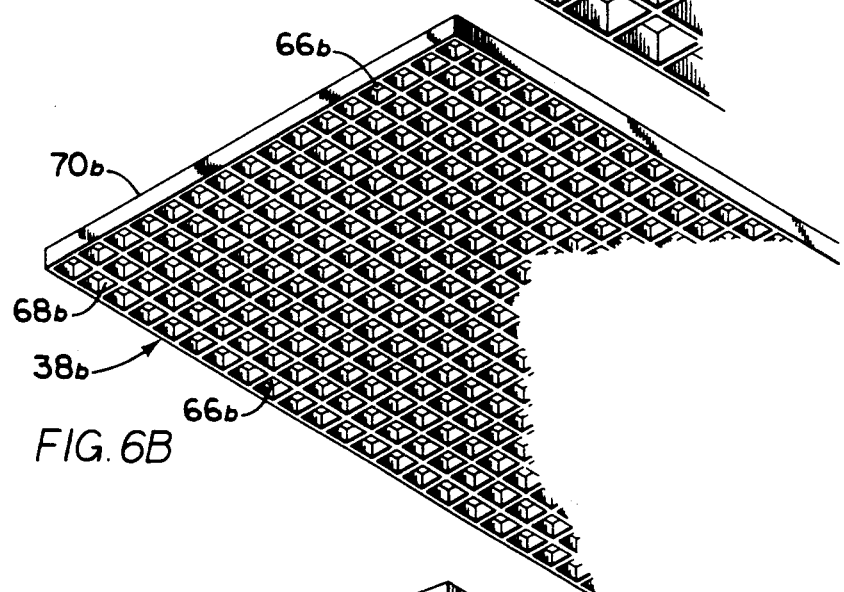
FIG. 6B is a partial perspective view of a second preferred embodiment of a lens constructed in accordance with the present invention.
Figure 6C:
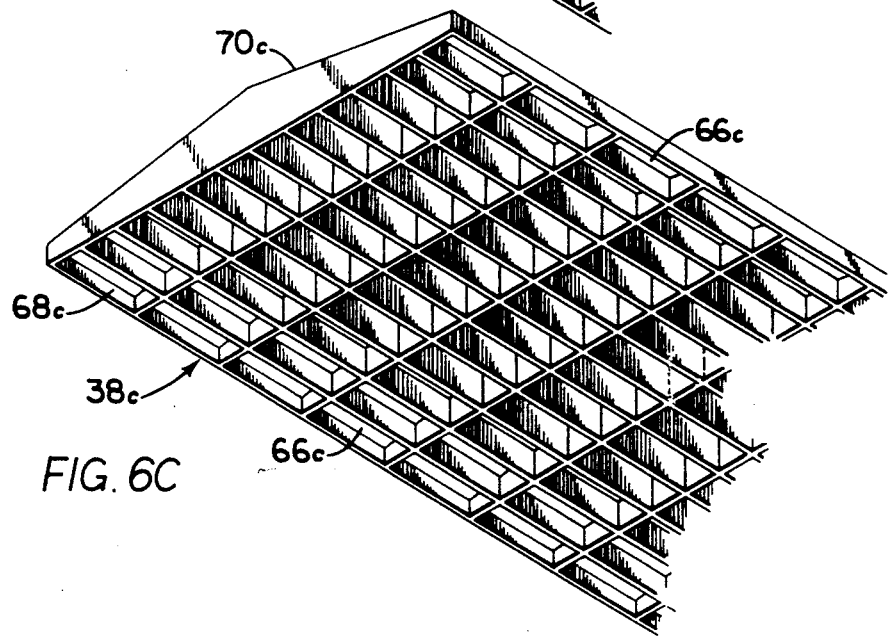
FIG. 6C is a partial perspective view of a third preferred embodiment of a lens constructed in accordance with the present invention.

As illustrated in FIGS. 6A-6C, a variety of lenses 38a, 38b, and 38c are also available. Each of these lenses have a plurality of adjoining apertures 66a, 66b, and 66c through which light is emitted. The plurality of apertures together form a light permeable grid that is substantially equal to or larger than the open light enclosure box bottom. The size and shape of the apertures effects both the intensity and the glare characteristics of the light emitted. For example, a lens such as 38b in FIG. 6B with smaller apertures 58b emits light with greater intensity but will cause more glare if the light fixture is to far above the work surface. In contrast, lens 38a in FIG. 6A reduces glare from the light fixtures required to be higher from the work surface.

Figure 7:
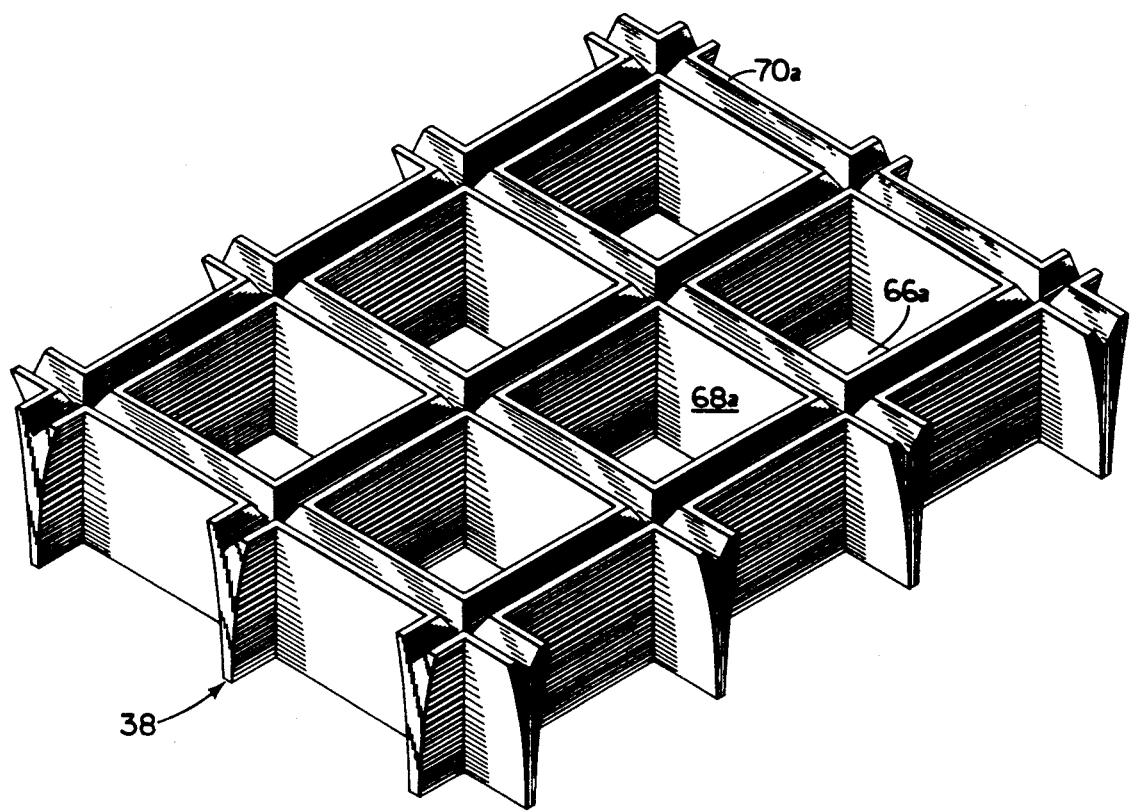
FIG. 7 is an enlarged partial perspective view of the preferred embodiment of a lens in FIG. 6A.

In addition to the size and shape of the apertures, the lens affects the characteristics of the light emitted from the light fixture and the shape and finish of the lens walls 68a, 68b, and 68c, which also form the portion of the lens connecting the apertures. The lenses illustrated in FIGS. 6A-6C have lens walls that are curved inward towards the apertures 66a, 66b, and 66c at the top 70a, 70b, and 70c of the lens. The lens walls have a highly reflective finish, such as a mirrored finish. Thus, the lens acts as a reflector also. The shape of the lens walls correspond to the portions of a parabolic curve. These features of a lens are shown in detail in FIG. 7 which is an enlarged portion of lens 38a. Many types of lenses are already commercially available. Success has been achieved using a Para-Lite III lens from A.L.P. Lighting and Ceiling Products, Inc. The lenses themselves can be made from any number of materials. Success has been achieved using high impact plastics. While the apertures shown in the drawings are substantially square or rectangular, they are available in other shapes such as circular or oval which can be used as is appropriate.

The only limitations on the curved configurations of the elongated shaped reflectors 30 or lens apertures 66 are those of the human imagination combined with the practical limitations of size and usefulness. By using different combinations of lenses 38 and reflectors the light emitted from the light fixture can be "tuned" to a specific application.

Example of an application where intensity, tint, and glare characteristics of lighting is critical are fruit sorting lines. Fruit is passed along sorting lines where sorters grade the fruit according to its quality. Since the grade of the fruit affects the price which will be paid for the fruit it is a critical determination. The fact that fruit varies in color, texture, and reflectivity makes it very difficult to sort more than one kind of fruit in a single area with a single type of lighting source. By using the present invention, a single sorting line could be used to sort a variety of fruits where the user would simply change the reflectors and lenses to obtain the correct tint, light intensity, and glare characteristic to enable sorters to sort a specific fruit. When a particular season ended, the elongated shaped reflectors and lenses could be changed for the next seasonal produce to be sorted.

High intensity lighting systems constructed in accordance with the present invention, were retrofitted to existing strip fluorescent light fixtures as an experimental installation in a company's apple sorting areas. The experimental installation occurred after nationwide inquiries indicated there were no existing lighting systems that would meet the company's lighting needs. After the experimental installation retrofitting the high intensity lighting systems was accomplished, employees working in the affected areas reported reduced sorting table light glare, and fewer associated employee complaints. The reduced glare and associated complaints came in the face of significantly increased light levels on work surfaces using the high intensity lighting systems installed in the existing strip fluorescent light fixtures which improved employee ability to sort fruit by more than 30%. This improvement was measured by the increased percentage of apples graded properly as a result of the improved lighting. Employees also reported much lower eye strain due to the improved lighting levels on the working surfaces.

At the site of the experimental installation, the existing strip fluorescent light fixture's light intensity at a work station was 70 to 150 foot candles, depending on the height of the light fixture. The output using a high intensity light system 20 with an elongated shaped reflector 22a as shown in FIG. 5A and a lens 38b as shown in FIG. 6B, is 270 to 325 foot candles at the work station with the light fixture 37 inches above the work station. Thus, the intensity of the light is improved dramatically while workers reported reduced eye strain and an accompanying improvement in the ability to perform the work.

While high output strip fluorescent light fixtures are presently being used, they are an open configuration with only a reflector 44 and tubes 40 as shown in FIG. 3. While there are existing enclosed high output strip fluorescent light fixtures, they have to be water cooled to enable them to function correctly. Thus, a user who wishes to go to an enclosed high output strip fluorescent light fixture is forced to remove the existing fixtures completely and to install water cooled fixtures with all of the added expense, complications, and reduced reliability incumbent in such a system. The water cooling aspect of existing enclosed high output fluorescent light fixtures is required due to the heat generated by such fixtures.

With the high intensity lighting system 20 constructed in accordance with the present invention, the high output ballast 48 is not contained within the light enclosure box 22. Rather, it is contained within the strip fluorescent housing 46. The high output ballast, a primary heat source in the high output strip fluorescent light fixture, has the existing strip fluorescent housing and the light enclosure box acting as heat sinks. Thus, the high intensity lighting system enables an existing strip fluorescent light fixture to be converted to an enclosed high output strip fluorescent light fixture without the expense of a totally new installation or water cooling. This is true whether the conversion is from open high output fixture to enclosed high output fixture, or even standard strip fluorescent light fixture to high output strip fluorescent light fixture.

Figure 8:
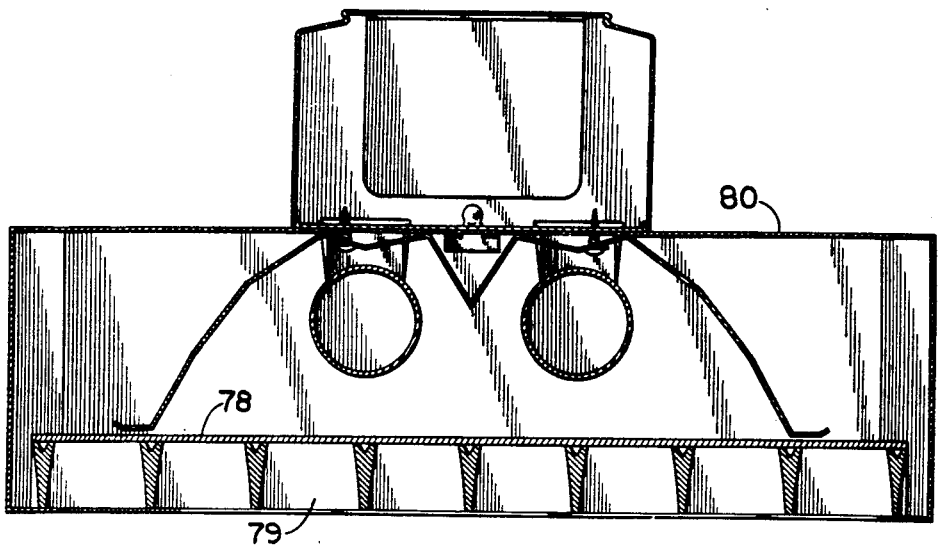
FIG. 8 is a cross-section view of an alternative preferred embodiment constructed in accordance with the present invention.

In addition to using the elongated shaped reflectors with different configurations, tint, or paint on the curve inner surface, another device which may be used to affect tint and intensity of the light is a translucent screen used in conjunction with an existing lens. As shown in FIG. 8, one way to use the translucent screen 78 is to simply lay it on top of the lens 79 within the light enclosure box 80. This may be desirable in applications where the work surface or items to be examined are highly reflective and tend toward glare.

Figure 9:
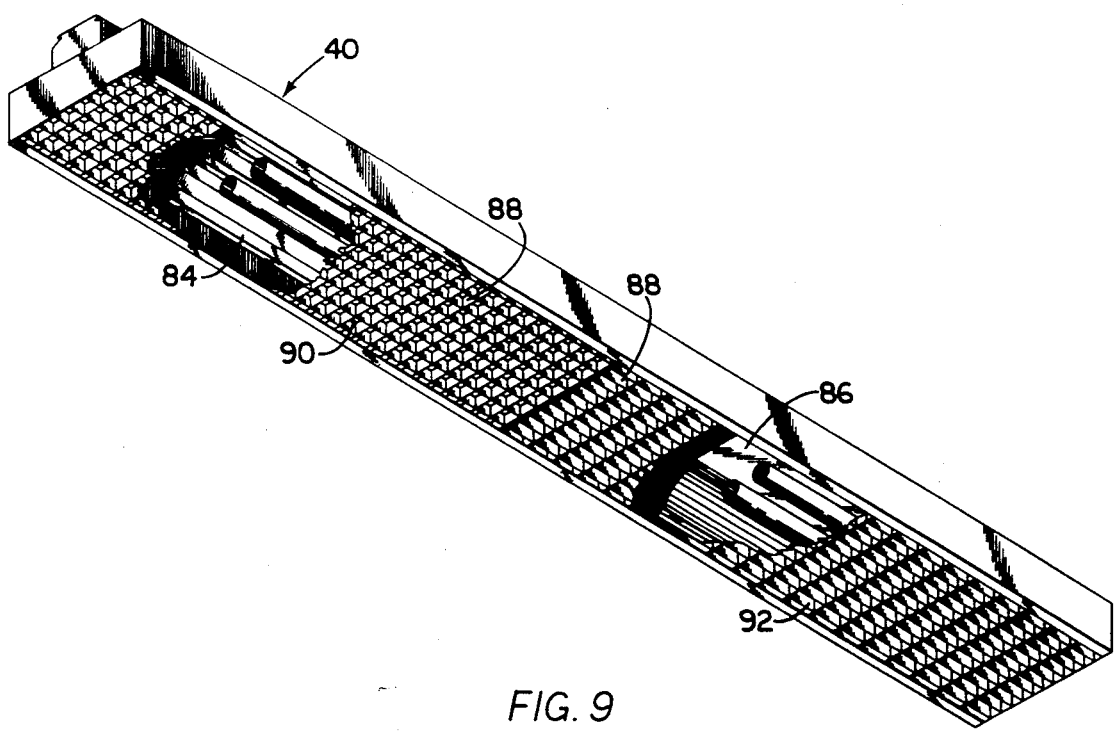
FIG. 9 is a cutaway perspective view of a second alternative preferred embodiment constructed in accordance with the present invention.

Another embodiment of the present invention makes even fuller use of the adaptive properties of the high output strip fluorescent light fixture constructed in accordance with the present invention as shown in FIG. 9. In this embodiment, of the elongated shaped reflector 82 has a first inner surface 84 and a second inner surface 86. The first inner surface 84 has a specular finish for high intensity lighting while second inner surface 86 may be painted to allow a work station where reading is required. This adaptability can also extend to the lens 88 which can have a first plurality of apertures 90 and a second plurality of apertures 92. An example of the use for such an embodiment would be where a fixture overlaps a sorting line and an area where reports must to be filled out. With this configuration, a single strip fluorescent light fixture can provide high intensity lighting for the sorting procedure while providing lower intensity lighting for the report writing work station. A variation of this embodiment would have an elongated shaped reflector with a single curved configuration but with the two portions illuminated by different finishes on the curved inner surface.

In practice, the first step for utilizing an embodiment of the present invention would be to evaluate the lighting in the affected area and determine the desired characteristics for lighting in the area to optimize working conditions. After these determinations have been made, the appropriate combination of high output ballast 48, light enclosure box 22, elongated shaped reflector 30, fluorescent light sockets 52, high output fluorescent light tubes 36, and lens 38 can be selected for installation.

As information on the appropriate combination of components for specific applications is gathered, data bases or "look up" tables can be created as reference guides which will enable a quick, efficient selection of the correct components for specific applications. An outgrowth of these data bases or tables is the ability to set up kits containing preselected components to enable the tuning of existing strip fluorescent light fixtures to specific applications without the need for individualized evaluations or experimentation for installation of a high output strip fluorescent light fixture in accordance with the present invention. These kits have at least a light enclosure box 22, an elongated shaped reflector 30, and a lens 38. The kits could also include a high output ballast 48, or fluorescent light sockets 52, or high output fluorescent light tubes 36, the number of components in the package would be dependent upon the extent to which components from the existing strip fluorescent light fixture could be used. Similarly, kits for tuning strip fluorescent light fixtures which have already been retrofitted with the high intensity lighting system 20 could be created using primarily just elongated shaped reflectors and lenses, since such a light fixture would already have the light enclosure box and very probably would have the correct ballast, fluorescent light sockets, and tubes. The variation on such kits is limited only by the variations on the applications and the desired tuning.

INDUSTRIAL APPLICABILITY

This invention would be useful in any situation where it is desirable to have a tunable high output strip fluorescent light fixture in which the intensity, tint, and/or glare characteristics of light emitted from the light fixture can be adjusted for particular applications.

In compliance with the statute, the invention has been described in language more or less specific as to structural features. It is understood, however, that the invention is not limited to the specific features shown, since the means and construction herein disclosed comprised preferred forms put in the invention to effect. The invention, therefore is claimed in any of its forms or modifications within the legitimate imbalance from the impended claims.

I claim:

1. A method for tuning an existing strip fluorescent light fixture, with said existing strip fluorescent light fixture having a strip fluorescent housing, a ballast, a reflector, at least two fluorescent light sockets, and at least one fluorescent light tube, to obtain lighting with desired characteristics in a specific area, wherein said tuning method comprises the steps of:
   determining said desired lighting characteristics;
   determining a combination of a high output ballast, a light enclosure box, an elongated shaped reflector, high output fluorescent light tube, and a lens for achieving said desired lighting characteristics;
   removing all said fluorescent light tubes and said reflector from said existing strip fluorescent light fixture, leaving said strip fluorescent housing;
   attaching said light enclosure box to said strip fluorescent housing;
   installing said elongated shaped reflector within said light enclosure box;
   plugging at least one said high output fluorescent light tube into said strip fluorescent housing inside said light enclosure box below said elongated shaped reflector; and
   attaching said lens to said light enclosure box to enclose said high output fluorescent light tubes.

2. The tuning method of claim 1, wherein said step of retrofitting said combination further comprises the step of replacing said ballast in said existing strip fluorescent light fixture with a high output ballast prior to attaching said light enclosure box to said strip fluorescent housing.

3. The tuning method of claim 2, wherein said step of retrofitting said combination further comprises the step of replacing each said fluorescent light sockets in said existing strip fluorescent light fixture with a fluorescent light socket suitable for use with said high output fluorescent light tubes prior to attaching said light enclosure box to said strip fluorescent housing.

4. The tuning method of claim 1, wherein said tuning method further comprises the step of first evaluating lighting from said existing strip fluorescent light fixture in said specific area.

5. The tuning method of claim 1, wherein said tuning method further comprises the step of using a reference guide to determine said combination after said desired lighting characteristics have been determined.

6. A kit for tuning an existing strip fluorescent light fixture to obtain lighting with desired characteristics in a specific area, said existing strip fluorescent light fixture having a strip fluorescent housing, a ballast, a reflector, at least two fluorescent light sockets, and at least one fluorescent light tube, said kit containing a combination of preselected components wherein said kit comprise:
   a light enclosure box, said light enclosure box having a length, a width, a height, an enclosed top, sides, and a bottom, said light enclosure box top and said light enclosure box sides forming a substantially hollow, enclosed box except for said bottom which is substantially open, said light enclosure box further being attachable to said strip fluorescent housing by an attachment system;

an elongated shaped reflector, said elongated shaped reflector having a length and a width, and said elongated shaped reflector fitting within and being attachable to said light enclosure box; and a lens, said lens having a plurality of adjoining apertures, said adjoining apertures forming a light permeable grid, said lens further having an area substantially equal to said open light enclosure box bottom, and said lens being attachable to said light enclosure box bottom so that said lens can substantially enclose said light enclosure box except for adjoining apertures.

7. A kit for tuning an existing strip fluorescent light fixture as claimed in claim 6, wherein said kit further comprises:

a high output ballast; and at least two fluorescent light sockets, said fluorescent light sockets being usable with high output fluorescent light tubes.

8. A kit for tuning an existing strip fluorescent light fixture as claimed in claim 7, wherein said kit further comprises:

a reference guide, said reference guide containing data that determines which said light enclosure box, said elongated shaped reflector, and said lens will result in said desired lighting characteristics.

9. A high intensity lighting system, said high intensity lighting system to be retrofit to an existing strip fluorescent light fixture, said existing strip fluorescent light fixture having a strip fluorescent housing, a ballast, a reflector, at least two fluorescent light sockets, and at least one fluorescent light tube, wherein said high intensity lighting system comprises:

a light enclosure box, said light enclosure box having a length, a width, a height, an enclosed top, sides, and a bottom, said light enclosure box top and said light enclosure box sides forming a substantially hollow, enclosed box except for said bottom which is substantially open, said light enclosure box further being attachable to said strip fluorescent housing by an attachment system;

an elongated shaped reflector, said elongated shaped reflector having a length and a width, and said elongated shaped reflector fitting within and being attachable to said light enclosure box; and a lens, said lens having a plurality of adjoining apertures, said adjoining apertures forming a light permeable grid, said lens further having an area substantially equal to said open light enclosure box bottom, and said lens being attachable to said light enclosure box bottom so that said lens can substantially enclose said light enclosure box except for adjoining apertures.

10. A high intensity lighting system as claimed in claim 9, wherein said high intensity lighting system further comprises:

a high output ballast:

at least two fluorescent light sockets, said fluorescent light sockets being usable with high output fluorescent light tubes; and at least one high output fluorescent light tube.

11. A high intensity lighting system as claimed in claim 9, wherein said attachment system further comprises:

said light enclosure box top having at least one slot for each said fluorescent light socket, said slots being substantially aligned with said fluorescent light sockets and providing openings through said light enclosure box top so that when said strip fluorescent housing is placed adjacent said light enclosure box top, said fluorescent light sockets extend into said light enclosure box; and a plurality of attachement mechanisms, said attachment mechanisms attaching said light enclosure box to said strip fluorescent housing.

12. A high intensity lighting system as claimed in claim 11, wherein said high intensity lighting system further comprises:

at least two edges, said edges extending inwardly proximate said light enclosure box bottom from said light enclosure box sides along said light enclosure box length, said edges extending sufficiently inward to allow said lens to rest on said edges.

* * * * *